United States Patent
Nakata et al.

(10) Patent No.: US 6,348,271 B1
(45) Date of Patent: *Feb. 19, 2002

(54) FILM HAVING GAS PERMEABILITY

(75) Inventors: Shinji Nakata; Youichi Kugimiya; Chikashi Okayama; Takanori Nakashima; Yuji Ando, all of Ichihara (JP)

(73) Assignee: Chisso Corporation, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/445,194

(22) PCT Filed: Apr. 2, 1999

(86) PCT No.: PCT/JP99/01761

§ 371 Date: Dec. 2, 1999

§ 102(e) Date: Dec. 2, 1999

(87) PCT Pub. No.: WO99/51665

PCT Pub. Date: Oct. 14, 1999

(30) Foreign Application Priority Data

Apr. 2, 1998 (JP) .......................... 10-107092

(51) Int. Cl.$^7$ .............................. B32B 27/00
(52) U.S. Cl. .................. 428/500; 428/515; 426/118; 426/415; 426/419
(58) Field of Search ................. 428/500, 515; 426/415, 419, 118

(56) References Cited

U.S. PATENT DOCUMENTS

| | | | |
|---|---|---|---|
| 5,100,849 A | 3/1992 | Miya et al. | 502/9 |
| 5,110,677 A | 5/1992 | Barmore | 428/349 |
| 5,122,490 A | 6/1992 | Uwai et al. | 502/113 |
| 5,134,174 A | 7/1992 | Xu et al. | 521/143 |
| 5,744,205 A * | 4/1998 | Kawai et al. | 428/34.2 |
| 6,086,967 A * | 7/2000 | Whiteman et al. | 428/35.7 |

FOREIGN PATENT DOCUMENTS

| | | |
|---|---|---|
| JP | 63-102634 | 5/1988 |
| JP | 63-152638 | 6/1988 |
| JP | 1-171434 | 7/1989 |
| JP | 04-004841 A * | 1/1992 |
| JP | 4-097843 | 3/1992 |
| JP | 4-296530 | 10/1992 |
| JP | 5-38792 | 2/1993 |
| JP | 5-112682 | 5/1993 |
| JP | 5-168398 | 7/1993 |
| JP | 6-211996 | 8/1994 |
| JP | 7-118429 | 5/1995 |
| JP | 7-330985 | 12/1995 |
| JP | 8-34103 | 2/1996 |
| JP | 8-217930 | 8/1996 |
| WO | WO 89/00960 | 2/1989 |

* cited by examiner

Primary Examiner—Stevan A. Resan
Assistant Examiner—Monique R. Jackson
(74) Attorney, Agent, or Firm—Kilpatrick Stockton LLP

(57) ABSTRACT

An object of the present invention is to provide a drawn polypropylene film as a wrapping material that has transparency and mechanical properties sufficient as a wrapping material yet having the needed gas permeability for maintaining the freshness of the enclosed goods and additionally enables control of permeability of gases to a certain proportion if needed even if secondary steps such as perforation processing, etc., are eliminated. The present invention provides a polypropylene film drawn at least monoaxially which comprises a propylene resin composition comprising a propylene polymer component and a copolymer component containing ethylene and propylene, wherein a content of the copolymer component is 7 to 70% by weight based on the weight of the composition, and the film has a thickness [$D_1$] of 10 to 100μm and has the following characteristics (1) to (3):

(1) [$T_{H2O}$] (a permeability of water vapor)=9 to 50 (unit: g/m$^2$·24 Hr, in accordance with JIS Z-0208), (2) [$T_{O2}$] (a permeability of oxygen gas)=600–12,500 (unit: nmol (STP)/m$^2$·s·100 kPa, in accordance with JIS K-7126A), (3) [$T_{ethylene}$] (a permeability of ethylene gas)=600–22,500 (unit: nmol (STP)/m$^2$·s·100 kPa, in accordance with JIS K-7126A.)

15 Claims, No Drawings

FILM HAVING GAS PERMEABILITY

TECHNICAL FIELD

The present invention relates to a film having a good gas-permeability. More particularly, it relates to a film that can be used as a wrapping material for fresh produce such as vegetables and fruit because its properties of permeating gases such as water vapor, oxygen and ethylene suitably are required for them.

BACKGROUND ART

Recently, plastic films are widely used in food wrapping, textile wrapping, etc. In particular, as a representative of polyolefin films, polypropylene film drawn at least in a monoaxial direction (hereafter, sometimes abbreviated as drawn PP film) have been used in many fields since it has excellent transparency, gloss, and further high mechanical strength so that it is excellent in printing processability, bagging processability and filling workability thereinto.

Generally, drawn PP films have increased film densities since orientation increases the regularity of molecular orientation, so that gases such as water vapor and oxygen become more difficult to pass through. In particular, their use for wrapping fresh produce such as vegetables and fruit is undesirable since insufficient supply of oxygen to the wrapped contents, insufficient exhaustion of ethylene gas generated by the wrapped contents or the like will decrease the freshness of the wrapped contents. Further, water vapor generated by a vegetable or fruit forms water droplets on the inner surface of the film contacting the wrapped contents and the droplets drip onto the vegetable or fruit, which is a defect that might cause its discoloration or putrefaction. In other words, fresh produce such as vegetables and fruit respire by themselves after harvested and will be aged and putrefied. It is ethylene gas generated by fresh produce themselves such as vegetables and fruit that causes them to respire. As a wrapping film that can retain the freshness of the fresh produce have been studied or partly used films containing a porous structure such as activated carbon or Oya-stone. An adsorptive effect of the porous structure being utilized therein, they are intended to restrain the fresh produce from respiring by themselves by absorption of the ethylene gas, which have been generated from the fresh produce, and fixation onto the porous structure of it in the film. However, the porous structures are limited in adsorptivity. For example, once they absorb moisture and their adsorptivity reaches near saturation, then their ability of exhausting ethylene will be decreased greatly. Furthermore, in the environment where excessive moisture is present, the porous structures that have once adsorbed ethylene will release a portion of the ethylene. Therefore, it cannot be said that they have an ability to retain sufficient freshness as a wrapping film therefrom for fresh produce that are generally stored or circulated under high humidity conditions. On the other hand, it is said that fresh produce will lose the qualification as a commercial good when they lose usually 5% or more of their moisture. To maintain freshness, it is also necessary to restrain moisture from transpiring appropriately. On the contrary, excessive humidification or dew formation also causes putrefaction of the wrapped fresh produce. While wrapping films are required of high transparency in order to appeal the quality of the wrapped contents such as freshness through the film for consumer's examination, films containing a porous structure will decrease transparency due to the existence of the porous structure. At present, drawn polypropylene films circulated for wrapping fresh produce are used by blending a droplet preventing agent with the film to prevent dew formation still being unable to control the transpiration of water vapor or by being perforated by physical means during the process up to the wrapping step in order to increase aeration of water vapor, oxygen, carbon dioxide, etc.

DISCLOSURE OF THE INVENTION

The present invention has been made in view of the above-described defects of the drawn PP films and has for its object to provide a film suitable for wrapping fresh produce and propose a film that can control gases related to the physiological activity of fresh produce and restrain the transpiration suitably. More particularly, an object of the present invention is to provide a film that is excellent in productivity and profitability in wrapping vegetables or fruit due to the fact that the step of perforation conventionally conducted can be eliminated since gases such as water vapor, oxygen, and ethylene advantageously permeate the film and the permeability can be controlled, additionally the film having transparency, gloss, and further excellent mechanical strength, particularly the film being suited for wrapping fresh produce.

To achieve the above-described objects, the present inventors have made intensive research and as a result have found that a film which is a monolayer or multilayer film having a thickness $[D_1]$ of 10 to 100 μm and having the following characteristics (1) to (3):

(1) $[T_{H2O}]$ (a permeability of water vapor)=9–50 (unit: g/m$^2$·24 Hr, in accordance with JIS z-0208), (2) $[T_{O2}]$ (a permeability of oxygen gas)=600–12,500 (unit: nmol (STP)/m$^2$·s·100 kPa, in accordance with JIS K-7126A)

(3) $[T_{ethylene}]$ (a permeability of ethylene gas)=600–22,500 (unit: nmol (STP)/m$^2$·s·100 kPa, in accordance with JIS K-7126A) have excellent properties, thus completing the present invention.

That is, in a first aspect, the present invention provides a gas permeable film having the above-described three types of permeability in good balance.

In a second aspect, the present invention provides a film which comprises a propylene resin composition comprising a propylene polymer component and a copolymer component comprising ethylene and propylene, wherein a limiting viscosity ratio of the propylene polymer component and the copolymer component, and a weight ratio of the propylene polymer component and the copolymer component are within specified ranges respectively, wherein the film is drawn in at least one direction, and the film having a thickness $[D_1]$ of 10 to 100 μm and has the following characteristics (1) to (3):

(1) $[T_{H2O}]$ (a permeability of water vapor)=9–50 (unit: g/m$^2$·24 Hr, in accordance with JIS Z-0208), (2) $[T_{O2}]$ (a permeability of oxygen gas)=600–12,500 (unit: nmol (STP)/m$^2$·s·100 kPa, in accordance with JIS K-7126A)

(3) $[T_{ethylene}]$ (a permeability of ethylene gas)=600–22,500 (unit: nmol (STP)/m$^2$·s·100 kPa, in accordance with JIS K-7126A)

Further, in a third aspect, the present invention provides a monolayer film for wrapping fresh produce, which comprises a propylene resin composition comprising a propylene polymer component and a copolymer component comprising ethylene and propylene, wherein a content of the propylene polymer component $[W_{PP}]$ is 93 to 30% by weight and a content of the copolymer component $[W_{RC}]$ is 7 to 70% by weight based on the weight of the composition, and a limiting viscosity of the copolymer component $[\eta]_{RC}$ is 1.5 to 3.0 dl/g and a ratio $([\eta]_{RC}/[\eta]_{PP})$ of the limiting viscosity of the copolymer component $[\eta]_{RC}$ to the limiting viscosity of the propylene polymer component $[\eta]_{PP}$ is in the range of 0.5 to 1.2, wherein the propylene resin composition being processed and drawn in the range from 3 to 60 times, the monolayer film having a thickness $[D_1]$ of 10 to 100 μm and a relationship between $[D_1]$ and $[W_{RC}]$ of $0.1 \leq W_{RC}/D_1 \leq 7.0$, and the film having the following characteristics (1) to (3):
(1) $[T_{H2O}]$ (a permeability of water vapor)=9–50 (unit: g/m²·24 Hr, in accordance with JIS Z-0208),
(2) $[T_{O2}]$ (a permeability of oxygen gas)=600–12,500 (unit: nmol (STP)/m²·s·100 kPa, in accordance with JIS K-7126A)
(3) $[T_{ethylene}]$ (a permeability of ethylene gas)=600–22,500 (unit: nmol (STP)/m²·s·100 kPa, in accordance with JIS K-7126A)

Furthermore, the present invention provides a multilayer film for wrapping fresh produce, comprising a film (I) comprising a propylene resin composition which comprises a propylene polymer component and a copolymer component comprising ethylene and propylene, wherein a content of the propylene polymer component $[W_{PP}]$ is 93 to 30% by weight and a content of the copolymer component $[W_{RC}]$ is 7 to 70% by weight based on the weight of the composition, wherein a limiting viscosity of the copolymer component $[\eta]_{RC}$ is from 1.5 to 3.0 dl/g and a ratio ($[\eta]_{RC}/[\eta]_{PP}$) of the limiting viscosity of the copolymer component $[\eta]_{RC}$ to the limiting viscosity of the propylene polymer component $[\eta]_{PP}$ is in the range of 0.5 to 1.2, wherein the film (I) is obtained by processing the propylene resin composition and drawing it in the range from 3 to 60 times; and a film (II) obtained by processing at least one polymer selected from (a) to (d) listed below:
(a) a polypropylene homopolymer which has a density of 0.89 to 0.91 g/cm³ and a crystal melting point of 165 to 160° C.;
(b) a copolymer comprising propylene and ethylene, which has a density of 0.89 to 0.91 g/cm³ and a crystal melting point of 159 to 110° C.;
(c) a copolymer comprising propylene and an α-olefin having 4 or more carbon atoms, which has a density of 0.89 to 0.91 g/cm³ and a crystal melting point of 159 to 110° C.; and
(d) a copolymer comprising ethylene, propylene and butene-1, which has a density of 0.89 to 0.91 g/cm³ and a crystal melting point of 159 to 110° C.;
the multilayer film having a thickness of 10 to 100 μm, and comprising the film (I) having 50% or more based on the thickness of the multilayer film, and the multilayer film having the following characteristics (1) to (3):
(1) $[T_{H2O}]$ (a permeability of water vapor)=9–50 (unit: g/m²·24 Hr, in accordance with JIS Z-0208),
(2) $[T_{O2}]$ (a permeability of oxygen gas)=600–12,500 (unit: nmol (STP)/m²·s·100 kPa, in accordance with JIS K-7126A)
(3) $[T_{ethylene}]$ (a permeability of ethylene gas)=600–22,500 (unit: nmol (STP)/m²·s·100 kPa, in accordance with JIS K-7126A)

Still further, the present invention provides a method of controlling gas permeability of a polypropylene film, characterized by comprising processing, a propylene resin composition which comprises a propylene polymer component and a copolymer component comprising ethylene and propylene, wherein a content of the propylene polymer component $[W_{PP}]$ is 93 to 30% by weight and a content of the copolymer component $[W_{RC}]$ is 7 to 70% by weight based on the weight of the composition, wherein a limiting viscosity of the copolymer component $[\eta]_{RC}$ is 1.5 to 3.0 dl/g and a ratio $[\eta]_{RC}/[\eta]_{PP}$) of the limiting viscosity of the copolymer component $[\eta]_{RC}$ to the limiting viscosity of the propylene polymer component $[\eta]_{PP}$ is in the range of 0.5 to 1.2; and drawing it in the range from 3 to 60 times; and controlling a content of the copolymer $[W_{RC}]$ relative to the thickness of the film $[D_1]$ so as to satisfy a relationship of $0.1 \leq W_{RC}/D_1 \leq 7.0$ in a range where the film has a thickness $[D_1]$ of 10 to 100 μm.

The gas-permeable film of the present invention, within the range of a thickness of the film $[D_1]$ of 10 to 100 μm, has the following characteristics (1) to (3):
(1) $[T_{H2O}]$ (a permeability of water vapor)=9–50 (unit: g/m²·24 Hr, in accordance with JIS Z-0208),
(2) $[T_{O2}]$ (a permeability of oxygen gas)=600–12,500 (unit: nmol (STP)/m²·s·100 kPa, in accordance with JIS K-7126A)
(3) $[T_{ethylene}]$ (a permeability of ethylene gas)=600–22,500 (unit: nmol (STP)/m²·s·100 kPa, in accordance with JIS K-7126A)

In the present invention, the thickness of gas-permeable film is preferably from 10 to 100 μm in view of moldability and workability (wrapping property) and the like of film. If the film thickness is thinner than 10 μm, the thickness would not be uniform and if it is thicker than 100 μm, the permeability of gases becomes low, which is not preferable. In particular, a thickness of 15 to 70 μm is preferred since the freshness of fresh produce can be retained well.

If the permeability of water vapor of the film is lower than 9, the moisture tends to be trapped in the wrapping and accelerate putrefaction while if it exceeds 50, fresh produce, in particular vegetables tend to be dried and grow withered, which is not preferable. If the permeability of oxygen gas is lower than 600, it is difficult for fresh produce to respire so that they tend to lose freshness while if it is higher than 12,500, the permeability of water vapor concomitantly becomes too high, which is not preferable. It is preferred that the permeability of oxygen gas is from 600 to 12,500, particularly from 1,000 to 5,000. If the permeability of ethylene gas is lower than 600, the putrefaction of fresh produce tends to be accelerated while if it is higher than 22,500, the permeability of water vapor concomitantly becomes too high, which is not preferred. It is preferred that the permeability of ethylene gas is from 600 to 22,500, particularly from 600 to 9,000.

The gas-permeable film of the present is invention is a film that comprises the specified propylene resin composition below and is a non-drawn, or drawn (monoaxially drawn, or biaxially drawn) film thereof. Examples of the method for producing such a film include a T-die method and an inflation method that are usually used for the production of polyolefin film. The drawing method includes, for example, a sequential biaxial drawing method using a tenter system and a simultaneous biaxial orientation method using a tubular system.

The propylene resin composition used in the present invention is preferably a composition which comprises a propylene polymer component and a copolymer component comprising ethylene and propylene, wherein the copolymer component is contained in the range of 7 to 70% by weight based on the weight of the composition in view of the property that the freshness of fresh produce can be retained well. If the copolymer content is less than 7% by weight, the amount of gases permeability is low while if it is higher than 70% by weight, the film obtained is opaque so that commercial value decreases as a wrapping material which appeals the freshness of the enclosed contents or the like to consumers, which is not preferable. In particular, it is preferred as a wrapping material for fresh produce that the copolymer component is contained in an amount of 15 to 50% by weight, particularly preferably from 20 to 50% by weight.

It is preferred, as a wrapping material for fresh produce, because of good transparency and appearance that the limiting viscosity $[\eta]_{RC}$ of the copolymer component measured in tetralin at 135° C. is from 1.5 to 3.0 dl/g and its limiting viscosity ratio $[\eta]_{RC}/[\eta]_{PP}$ to the limiting viscosity $[\eta]_{PP}$ of the propylene polymer component measured under the same conditions is from 0.5 to 1.2. The limiting viscosity of the copolymer component $[\eta]_{RC}$ influences the mechanical properties such as film-forming property as well as the rigidity and transparency of film and the limiting viscosity ratio $[\eta]_{RC}/[\eta]_{PP}$ influences the dispersibility of the copolymer component in the propylene polymer component. If $[\eta]_{RC}$ is smaller than 1.5 dl/g, the mechanical properties of the resultant film decreases while if it is larger than 3.0 dl/g, the film is opaque, which is not preferably. Furthermore, if $[\eta]_{RC}/[\eta]_{PP}$ is larger than 1.2, the film is opaque while if it is smaller than 0.5, the strength of film decreases, which is not preferable.

It is preferred that the copolymer component contains 20 to 90% by weight of ethylene polymerization unit based on the weight of the copolymer component since proper permeability of gases can be obtained. If the ethylene polymerization unit is less than 20% by weight, the permeability of gases decreases while if it is more than 90% by weight, the resultant film becomes opaque and is not preferable. In particular, when the ethylene polymerization unit is contained in an amount of 20 to 55% by weight, preferably from 25 to 55% by weight, a more transparent, good looking wrapping material for fresh produce can be obtained.

It is preferred that the copolymer component contains 80 to 99.6% by weight based on the weight of the copolymer component, of a component soluble in 20° C. xylene therein in order to maintain a preferred permeability of gases. If the amount of the component soluble in 20° C. xylene is less than 80% by weight, the permeability of gases is small, which is not preferable.

The propylene polymer referred to herein includes a homopolymer of propylene (propylene homopolymer) and in addition propylene-olefin copolymers having a propylene polymerization unit content of 92% by weight or more.

Herein, a propylene polymer consisting essentially of propylene polymerization unit usually means a propylene homopolymer or a copolymer of propylene and an olefin in which the propylene polymerization unit content is 92% by weight or more. The copolymer of ethylene and propylene consisting essentially of an ethylene polymerization unit and a propylene polymerization unit usually means a copolymer of ethylene and propylene in which the ethylene polymerization unit content is from 20 to 90% by weight and the propylene polymerization unit content is from 80 to 10% by weight.

The film of the present invention preferably is particularly a polyolefin film obtained by using polyolefin consisting essentially of an olefin polymerization unit, more preferably a polypropylene film obtained by a propylene resin composition which comprises a propylene polymer component consisting essentially of propylene polymerization units and a copolymer component comprising ethylene and propylene that consists essentially of propylene polymerization units and ethylene polymerization units. And when the film is obtained by using the composition to meet the constitution prescribed by the present invention, particularly the film of the present invention has properties being suitable for wrapping fresh produce, i.e. in that even in the form of a monolayer it has excellent transparency, film strength, fusing seal strength, and heat seal strength and it is possible to control gas-permeability by adjusting the content of copolymer comprising ethylene and propylene in the composition and furthermore adjusting drawing ratio. For example, there has previously been proposed a method of introducing chemical structure having a polar group into one of the components of the composition which constitutes the polyolefin film as a means for providing gas permeability of the films or the like method. Polyolefin films are cut and recycled as a raw material. However, there is the possibility that use of such heterogeneous components generates a restriction in recycling the polyolefin films, and in addition when it is contemplated to make a laminate film having the film as one of layer components, there arise a need for selecting films constituted by components having affinity for that the chemical structure including the polar group and the like as other film components, it also generates a restriction in designing a multilayer film. The film of the present invention uses a polyolefin film consisting essentially of an olefin polymerization unit and even in the form of a monolayer film has excellent aptitude as a wrapping film for fresh produce and in this regard is very significant in industry.

The propylene component is preferably a propylene homopolymer or a propylene-olefin copolymer containing 92% by weight or more of propylene polymerization units, wherein an isotactic pentad fraction [P] is 0.95 or more in the case of the propylene homopolymer and is 0.85 or more in the case of the copolymer, in order to increase mechanical properties such as the rigidity of the resultant drawn polypropylene film and improve workability or productivity in the process of wrapping fresh produce and the like.

Furthermore, it is preferred that Q value [Mw/Mn] of the propylene resin composition is less than 5 in order to provide good gloss to the drawn polypropylene film. If Q value is larger than 5, it is difficult to obtain an drawn polypropylene film that has good gloss. In particular, it is preferred that the propylene resin composition have a narrow molecular weight distribution such that Q value is not more than 4.7 in order to obtain a transparent, good looking wrapping material for green goods.

The drawn polypropylene film of the present invention is preferably the one that is obtained by processing the propylene resin composition used in the present invention and then drawing the processed molded article at least in a monoaxial direction so as to be a drawing ratio of 3 to 60 times in order to retain transparency, strength, and amount of gases permeability. If the drawing ratio is smaller than 3 times, films having a non-uniform film thickness thereof tend to be obtained while if it is larger than 60 times, molding of film itself is difficult, which is not preferred. Preferably the drawing ratio is from 10 to 60 times, more preferably from 20 to 50 times. In order to provide the film strength required for wrapping materials and further straight cut property, polypropylene films are particularly drawn before they can be used. Generally, polypropylene films have properties that they tend to become less permeable to gases such as water vapor and oxygen when they are drawn to have increased regularity in the orientation of molecules and have an increased density. However, the propylene resin composition used advantageously in the present invention has features that when it is drawn it has a less decrease in gas permeability and further it has excellent transparency so that if required to depending on the environment in which it is used, it is possible to design a thicker film. Furthermore, since a decrease in gas permeability is low, in addition to the adjustment of the content of the copolymer component contained in the composition, it is possible to control the film strength and gas permeability to desired ranges by adjusting the drawing ratio. The drawn polypropylene film of the present invention can be produced by molding the propylene resin composition of the invention by using T-die method or inflation method to obtain a sheet and then drawing the sheet monoaxially or biaxially. The drawing method includes a sequential biaxial drawing method using a tenter system, a simultaneous biaxial method using a tubular system, and the like.

The melt flow rate (230° C., load: 21.18 N) of the propylene resin composition is preferably from 0.1 to 10 g/10 minutes, more preferably from 1 to 5 g/10 minutes in view of the moldability upon film molding and the appearance of the resultant film.

It is preferred that the drawn polypropylene film of the present invention has a film thickness $[D_1]$ ($\mu$m) and the copolymer content $[W_{RC}]$ (% by weight) in the propylene resin have a relationship of $0.1 \leq W_{RC}/D_1 \leq 7.0$ (unit: % by weight/$\mu$m) in order to provide proper gas permeability regardless of the thickness of films. If this ratio is smaller than 0.1, the resultant film has a low gas permeability while if this ratio is larger than 7.0, the transparency of film tends to be lost, which is not preferably. Furthermore, the ratio is in the range of preferably $0.3 \leq W_{RC}/D_1 \leq 3.0$ (unit: % by weight/$\mu$m), particularly preferably $1.0 \leq W_{RC}/D_1 \leq 2.5$ (unit: % by weight/$\mu$m).

In the drawn polypropylene film of the present invention, the permeability of each gas, i.e., water vapor, oxygen and ethylene well correlates with the % by weight ($W_{RC}$) of the copolymer component comprising ethylene and propylene contained in the propylene resin composition used in the present invention. Therefore, if the objective wrapping use is set (that is, film thickness and the like are set), and the required gas permeability is set, then a suitable % by weight of the copolymer component can be known in advance according to the above-described equation and a propylene resin composition to be used is designed accordingly so that the gas permeability of the resultant polypropylene film for wrapping can be controlled to a desired value.

More specifically, in the drawn polypropylene film of the present invention, the permeability of each gas calculated for 25 $\mu$m in thickness has a relationship indicated by approximate equations (A), (B) or (C). Therefore, from these equations, it is possible to know the permeability of each gas specifically to be provided depending on the kind of fresh produce to be wrapped and the form of wrapping and reflect the gas permeability to the film to be produced more precisely.

$$T_{H2O} \approx 5.5 + 0.40 \cdot (W_{RC}) \quad \text{Equation (A):}$$

$$T_{O2} \approx 600 + 65.6 \cdot (W_{RC}) \quad \text{Equation (B):}$$

$$T_{ethylene} \approx 350 + 21.2 \cdot (W_{RC}) + 2.6 \cdot (W_{RC})^2 \quad \text{Equation (C):}$$

The drawn polypropylene of the present invention, when the film thickness [D1] is in the range of 10 to 100 $\mu$m, has (1) a permeability of water vapor $[T_{H2O}]$ (in accordance with JIS Z-0208), (2) a permeability of oxygen gas $[T_{O2}]$ (in accordance with JIS K-7126A), and (3) a permeability of ethylene gas $[T_{ethylene}]$ (in accordance with JIS K-7126A) that can satisfy the following numerical ranges.

If a permeability of water vapor of the film is less than 5.5, the moisture is filled inside the wrapping to accelerate putrefaction while if it is more than 50, fresh produce, particularly vegetables are dried and tend to be withered, which is not preferably. If the permeability of oxygen gas is less than 600, fresh produce cannot respire so that they tend to lose freshness while if it is more than 12,500, the permeability of water vapor becomes too large concomitantly, which is not preferable. The permeability of oxygen gas is preferably from 600 to 12,500, particularly from 1,000 to 5,000. If the permeability of ethylene gas is less than 600, the putrefaction of fresh produce tends to be accelerated while if it is more than 22,500, the permeability of water vapor tends to become too large concomitantly, which is not preferable. The permeability of ethylene gas is preferably from 600 to 22,500, particularly from 600 to 9,000.

The propylene resin composition used in the present invention may be produced in any method so long as the above-described various properties are satisfied. In the case where a composition containing a propylene polymer component and a copolymer component comprising ethylene and propylene is used, the composition may, of course, be obtained by mixing, in a mixing apparatus, the propylene polymer component and the copolymer component separately produced, which copolymer component comprises ethylene and propylene. Advantageously, it can be produced in a multistep polymerization method such that the propylene polymer component is produced in a first polymerization step and subsequently in a second polymerization step the copolymer of ethylene and propylene is produced continuously. In the case of the composition obtained by such a multistep polymerization method, the limiting viscosity $[\eta]_{RC}$ of the copolymer component in the composition cannot be measured directly but can be obtained by calculation from the limiting viscosity of the proplylene polymer component $[\eta]_{PP}$ and the limiting viscosity of the propylene resin composition $[\eta]_{WHOLE}$ and the % by weight of the copolymer component $[W]_{RC}$ by the following equation (1).

$$[\eta]_{RC} = \{[\eta]_{WHOLE} - (1 - W_{RC}/100)[\eta]_{PP}\}/(W_{RC}/100) \quad (1)$$

A continuous production method includes a method in which the polypropylene polymer component is produced using a catalyst comprising a complex containing magnesium, titanium and a halogen, an organicometal compound containing a metal of Group 1 to 3 of the periodic table, and an electron donor and then the copolymer component comprising ethylene and propylene is produced by a known polymerization process.

The production method for the above-described propylene resin composition, which is a preferred constituent component of the propylene resin composition of the present invention, is already known. For example, it may be produced by performing polymerization of polypropylene (first polymerization step) in the presence of a stereospecific catalyst comprising a combination of a titanium-containing solid catalyst component ($\alpha$) having a large particle diameter and an organoaluminum ($\beta$) and an optional organosilicon compound ($\gamma$) in a gas phase and then performing polymerization of propylene-ethylene copolymer (second polymerization step).

Here, the titanium-containing solid catalyst ($\alpha$) may be used without a carrier, or with inorganic carriers such as a magnesium compound, a silica compound and alumina, or with organic carriers such as polystyrene, or with those to which electron donors such as ethers or esters are added by reaction.

Specific examples thereof include a titanium-containing solid catalyst obtained by spraying an alcohol solution of magnesium compound and partially drying resultant solid component and treating the dried solid component with a titanium halide and an electron donor (Japanese Patent Application Laid-open No. Hei 3-119003), and a titanium-containing solid catalyst obtained by dissolving a magnesium compound in a solution of tetrahydrofuran/alcohol/electron donor, and precipitating a magnesium compound carrier with a titanium halide alone or in combination with an electron donor, and treating the magnesium compound carrier with a titanium halide and an electron donor (Japanese Patent Application Laid-open No. Hei 4-103604).

As the titanium-containing solid catalyst ($\alpha$) is said to be preferable the one having an average particle diameter of 25 to 300 $\mu$m, preferably from 30 to 150 $\mu$m, further the one having a uniformity of 2.0 or less in a particle diameter distribution, since the resultant block copolymer has a good flowability so that continuous stable operation is possible.

As the organoaluminum compound ($\beta$), there may be used an organoaluminum compound represented by general formula $AlR^1_p R^2_q X_{3-(p+q)}$ (wherein $R^1$ and $R^2$ which may be the same or different, represent each a hydrocarbon group such as an alkyl group, a cycloalkyl group, or an aryl group, or an alkoxy group, X represents a halogen atom, and p and q are positive integers provided that $0 < p+q \leq 3$).

Specific examples of the organoaluminum compound include trialkylaluminums such as trimethylaluminum, triethylaluminum, tri-n-propylaluminum, tri-n-butylaluminum, tri-i-butylaluminum, tri-n-hexylaluminum, tri-i-hexylaluminum, and tri-n-octylaluminum, dialkylaluminum monohalides such as diethylaluminum chloride, di-n-propylaluminum chloride, di-i-butylaluminum chloride, diethylaluminum bromide, and diethylaluminum iodide, dialkylaluminum hydrides such as diethylaluminum hydride, alkylaluminum sesquihalides such as ethylaluminum sesquichloride, monoalkylaluminum dihalides such as ethylaluminum dichloride, and alkoxyalkylaluminum such as diethoxymonoethylaluminum, etc. Preferably, trialkylaluminums and dialkylaluminum monohalides are used. Not only one kind but also two or more kinds of these organoaluminum compounds may be used as admixtures.

The organosilicon compound (γ) includes organosilicon compounds having a Si—O—C bond in the molecule such as trimethylmethoxysilane, dimethyldimethoxysilane, methylphenyldimethoxysilane, diphenyldimethoxysilane, methyltrimethoxysilane, vinyltrimethoxysilane, phenyltrimethoxysilane, trimethylethoxysilane, dimethyldiethoxysilane, di-i-propyldimethoxysilane, di-i-butyldimethoxysilane, diphenyldiethoxysilane, methyltriethoxysilane, ethyltriethoxysilane, vinyltriethoxysilane, butyltriethoxysilane, phenyltriethoxysilane, ethyltriisopropoxysilane, vinyltriacetoxysilane, cyclopentylmethyldimethoxysilane, cyclopentyltrimethoxysilane, dicyclopentyldimethoxysilane, cyclohexylmethyldimethoxysilane, cyclohexyltrimethoxysilane, dicyclohexyldimethoxysilane, 2-norbornylmethyldimethoxysilane, etc.

In the production of the block copolymer, the stereospecific catalyst having blended therein the above-described titanium-containing solid catalyst component (α), organoaluminum compound (β), and optional organosilicon compound (γ) is used for the polymerizaton of propylene in the first polymerization step. In this case, the titanium-containing solid catalyst component (α) may be used after preliminary polymerization by reacting an olefin such as propylene in advance.

The polymerization system may be a batch system, a semi-continuous system or a continuous system. In many cases, the continuous system is used on an industrial scale.

In the production of the block copolymer, the first polymerization step may be gas phase polymerization, slurry polymerization, or mass polymerization. On the other hand, the second polymerization step conducted subsequent to the first polymerization step is in many cases gas phase polymerization since when the slurry polymerization or mass polymerization is adopted, the component containing the copolymer component comprising ethylene and propylene is eluted into the solution so that stable operation is sometimes difficult to continue. For this reason, in many cases the first polymerization step is also gas phase polymerization.

The conditions of polymerizing the propylene polymer component in the first polymerization step may be changed depending on the polymerization method used, but in the case of gas phase polymerization, polymerization is carried out by controlling the polymerization temperature to be of 20 to 120° C., preferably from 40 to 100° C., and the polymerization pressure to be from atmospheric pressure to 9.9 Mpa, preferably from 0.59 to 5.0 Mpa, supplying propylene and optionally an olefin other than propylene, if needed, while mixing and stirring a predetermined amount of polypropylene powder in the presence of a stereospecific catalyst comprising a titanium-contained catalyst carried out a preliminary polymerization step and the like.

In this case, the usage proportion of the organoaluminum (β) to the titanium-containing catalyst component (α) is in the range of Al/Ti=1–500 (by mole ratio), preferably from 10 to 30. The usage proportion of the organoaluminum compound (β) to the organosilicon compound (γ) is usually Al/Si=1–10 (by mole ratio), preferably from 1.5 to 8.

The molecular weight of the propylene polymer component is controlled by use of a molecular weight modifier such as hydrogen so that the limiting viscosity $[\eta]$ can satisfy a predetermined range.

After the polymerization of the propylene polymer component, a portion of the produced powder is taken out and can be measured for limiting viscosity, content of propylene polymerization unit, and polymerization yield per unit weight of the catalyst to confirm the properties of the polymer.

Next, subsequent to the above-described first polymerization step, the second polymerization step is practiced where a component containing a copolymer comprising ethylene and propylene s produced. Controlling the polymerization conditions in the second polymerization step to be a polymerization temperature from 20 to 120° C., preferably from 40 to 100° C., and to be a polymerization pressure from atmospheric pressure to 9.9 MPa, preferably from 0.59 to 5.0 MPa, a mixed monomer of ethylene and propylene is supplied to perform random copolymerization.

The weight of the component containing a copolymer component comprising ethylene and propylene to the weight of the propylene polymer component can be controlled by adjusting the polymerization time or by use of a polymerization activity controller such as carbon monoxide or hydrogen sulfide.

The molecular weight of the copolymer component comprising ethylene and propylene can be adjusted so that the limiting viscosity is within a predetermined range by addition of a molecular weight modifier such as hydrogen.

After completion of the second polymerization step as described above, monomers are removed, if needed, and post-treatment steps such as a known catalyst deactivation treatment step is performed to obtain a propylene resin composition.

The drawn polypropylene film of the present invention may be blended with known additives such as antioxidants, blocking inhibitors, anti-fogging agents, and surfactants in the range where the effect of the present invention is not inhibited. The method for adding the additives to the propylene resin composition may be any method that can mix them uniformly but a method of mixing by using a ribbon blender, Henschel mixer (trade name) or the like and melt-kneading the mixture by an extruder is preferred.

The multilayer film of the present invention contains a drawn polypropylene film using the propylene resin composition used in the present invention and one or more other films. The layer structure of the multilayer film includes (1) a two-layer film containing the drawn polypropylene film of the present invention and a film obtained by processing at least one polymer selected from (a) to (d), (2) a three-layer film containing the drawn polypropylene film of the present invention, a film obtained by processing at least one polymer selected from (a) to (d), and a film obtained by processing at least one polymer selected from (a) to (d). In the multilayer film, it is preferred that the drawn polypropylene film has 50% or more based on the thickness of the film in order to retain proper permeability rate of gases. If the thickness is smaller than 50%, the permeability rate of gases tends to be not enough, which is not preferable.

The production method for the multilayer film is not limited particularly and includes a multilayer extrusion molding method, a dry laminating method, an extrusion laminating method, etc.

Generally, when fresh produce are wrapped, a flat film is processed into a bag form by a known method such as a heat seal method or a fusing seal method. As the film construction for performing the seal methods advantageously, the following structures are preferred. For example, when heat sealing is carried out, it is preferred to use a laminate film having a backing layer and a seal layer, in which a melting point of the seal layer is lower than that of the backing layer by 5° C. or more, preferably 15° C. or more, or a laminnate film with a sealant film such as CPP film having a heat sealing property. That is, a multilayer film is preferred that comprises the film (I) above and a film selected from (b) to (d) above laminated on at least one side of the film (I) above. On the other hand, when fusing seal is carried out, the film construction is not limited particularly. If the film is a multilayer film, the surface layer does not always have to be the one that has a low melting point. That is, a multilayer film having the film (I) above on at least one side of which is laminated a film selected from (a) to (d) above may be used or it may be a monolayer film.

Conventionally, when films are used as a wrapping material for fresh produce, the films must be perforated for providing therein holes for permeating gases before they can be used since the films do not have sufficient gas permeability. However, such films have defects that although exhalation of ethylene gas generated by the enclosed contents and incorporation of oxygen gas need for respiration of fresh produce take place sufficiently, exhalation of water vapor from fresh produce proceeds simultaneously, resulting in that the fresh produce are dried and lose freshness. Furthermore, they have a serious defect that since bacteria invade through the holes, rot of the enclosed contents by the bacteria will occur. On the contrary, the gas permeable film of the present invention maintains sufficient incorporation of oxygen gas and exhalation of ethylene gas and in addition restrains exhalation of water vapor properly, and as a result the film of the present invention is effective in maintaining the freshness of fresh produce for a long period. Herein, vegetables, root vegetables, fruit, flowers, mushrooms are collectively referred to as fresh produce.

The film of the present invention has gas permeability suitable for wrapping fresh produce and can be adjusted for its gas permeability rate and mechanical properties (rigidity and transparency, etc.) of the resultant drawn polypropylene film by controlling the weight % of the copolymer component comprising ethylene and propylene in the polypropylene resin composition used.

Furthermore, the drawn polypropylene film of the present invention can eliminate conventional physical perforating step during the wrapping step so that it can provides high productivity and profitability.

Fresh produce suitable for being wrapped with the film of the present invention include the following.

For example, artichoke, asagi (a variation of Welsh onion), red bean, asparagus, avocado, aloe, apricot, strawberry, fig, iyokan (a variation of Japanese orange), udo (*Aralia cordata* Thumb.), plum, échallot, green soybeans, enokitake (*Flammulina velutipes* Sing.), okura (*Hibiscus esculentus* L.), olive, orange, radish seedlings (kaiwaredaikon), persimon, turnip, pumpkin, cauliflower, kiwi fruit, chrysanthemum, kikurage (a fungus, *Auricularia auricula-judae* Quel.), cabbage, cucumber, cumquat, ginkgonut, chestnut, green peas, walnut, grape fruit, water cress, gogyou , cowberry, burdock, komatsuna (*Brassia rapa*), coriander, cherry, pomegranate fruit, sweet potato, taro, shaddok, kidney bean, field peas, lettuce, shiitake (a fungus, *Lentinus edodes* Sing.), beefsteak plant, shimeji (a fungus, *Pleurotus ostreatus*), potato, changtsai, garland, small ginger (*Gingiber officinale* Rosc.), water melon, sweety, garden radish (suzushiro), turnip (suzuna), star fruit, zucchini, plum, Japanese parsley, celery, osmund, broad bean (soramame), tahsai, radish, soy bean, red pepper, bamboo shoot, onion, taranome (*Aralia elata* Seem.), chingensai, horsetail, tekopon, wax gourd, corn, tomato, durian, truffle, Chinese yam, naganegi (a variation of Welsh onion), egg plant, shepherd's purse (nazuna), Watson pomelo, rape blossoms, nameko (a fungus, *Flammulina velutipes* Sing.), nagauri (a variation of cucumber), Japanese pear, leek, carrot, garlic, pineapple, Chinese cabbage, chickweed, parsley, hassaku (a variation of Japanese orange), banana, papaya, banpeiyu (a variation of Japanese orange), pimento (green pepper), loquat, coltsfoot, the flower of coltsfoot, fukurotake (a fungus, *Volvariella volvacae*), grape, plum, blueberry, prune, broccoli, spinach, hotokenoza (*Lamium amplexicaule* L.), shaddock (ponkan), maitake (a fungus, *Grifola frondosa* S. F. Gray), muscat (a variation of grape), mashroom, matsutake, mango, mangosteen, Japanese orange, trefoil, myouga (*Gingiber Mioga* Rosc.), melon, peach, bean sprouts, mulukhiya, yamatoimo (*Colocasia antiquorum* Schott var. *esculenta* Engl.), citron, pear, mugwort, raichi, raspberry, radish, apple, lettuce, lemon, lotus root, wakegi (a variation of Welsh onion), horse-radish, etc.

BEST MODE FOR CARRYING OUT THE INVENTION

Hereafter, the present invention will be described more concretely. However, the present invention should not be limited thereto. Method for the measurement of physical properties and standards of evaluation indicated in Examples and Comparative Examples are as follows.

(1) Transparency: Haze value (unit: %)

This was measured according to the method described in ASTM D 1003. Smaller values indicate better transparency.

(2) Rigidity: Young's modulus (unit: Mpa)

This was measured according to the method described in ASTM D 882. Larger values indicate films with higher rigidity.

(3) Permeability of water vapor: $T_{H2O}$ (unit; $g/m^2 \cdot 24$ Hr)

This was measured according to the method described in JIS Z-0208. Measurement was performed at a temperature of 40° C. and a humidity of 90% RH.

(4) Permeability of oxygen: $T_{O2}$ (unit: nmol (STP)/$m^2 \cdot s \cdot 100$ kPa)

This was measured according to the method described in JIS K-7126A.

(5) Permeability of ethylene gas: $T_{ethylene}$ (unit: nmol (STP)/ $m^2 \cdot s \cdot 100$ kPa)

This was measured according to the method described in JIS K-7126A.

Here, [$D_1$] indicates the thickness ($\mu$m) of the film used in examples.

(6) Limiting viscosity (unit: dl/g)

Tetralin (tetrachloronaphthalene) was used as a solvent and measurement was performed at a temperature of 135° C. using an automatic viscosity measuring apparatus (AVS2 Type, manufactured by Mitsui Toatsu Co., Ltd.).

(7) Ethylene unit content (unit: % by weight)

This was measured by infrared absorption spectrometry.

(8) Amount of 20° C. xylene-soluble component (unit: % by weight)

This was measured according to ISO/DIS1873-1.

(9) MFR (unit: g/10 min)

This was measured based on the Test Condition 14 (230° C., 21.18N) of JIS K-7210.

(10) Q Value: This was measured by gel permeation chromatography. using weight average molecular weight (Mw) and number average molecular weight (Mn), it was calculated according to the following equation.

$$Q=Mw/Mn$$

(11) Isotactic pentad fraction (P)

This is an isotactic fraction in terms of pentad unit in the polypropylene molecular chain measured by $^{13}C$ nuclear magnetic resonance spectrum proposed by A. Zambelli, et al., "Macromolecules 6, 925 (1975)". The assignment of the peaks in the measurement of $^{13}$C nuclear magnetic resonance spectrum was made according to the one proposed in A. Zambelli, et al., "Macromolecules 8, 687 (1975)".

PP-3 used in Example 1 can be produced by following procedure.

<1> Preparation of Titanium-containing Solid Catalyst Component (α)

In a stainless steel autoclave, its inside air was substituted with a nitrogen, 953 g of anhydrous $MgCl_2$ and 3.52 liters of dry EtOH were added, and the mixture was heated at 105° C. with stirring to be dissolved in a solution. After 1 hour stirring, the solution was sprayed into a spray tower through a 2-fluid spray nozzle with pressurized nitrogen (1.1 Mpa) heated at 105° C. The flow rate of the nitrogen gas was 38 L/min. The inside of the spray tower was maintained at −15° C. by using liquid nitrogen. The powder (2,730 g) collected in cold hexane used on the bottom of the tower had a composition of $MgCl_2 \cdot 6EtOH$.

The obtained powder was sifted to obtain 2,180 g of spherical carrier having a particle diameter of 45 to 212 μm. The obtained carrier was dried by blowing nitrogen at a flow rate of 30 L/min at room temperature for 200 hours to obtain a dry carrier of $MgCl_2 \cdot EtOH$.

In a stainless steel reactor, 4.8 L of purified 1,2-dichloroethane, 400 g of dry carrier, 3.2 L of titanium tetrachloride were added, and the mixture was heated at 100° C. with stirring. Thereafter, 0.136 L of di-i-butyl phthalate was added and the mixture was heated at 100° C. for additional 2 hours and the liquid layer portion was removed by filtration with heating. To the residual solids, 6.4 L of purified 1,2-dichloroethane and 3.2 L of titanium tetrachloride were added, and the mixture was heated at 100° C. for 1 hour and the liquid layer portion was removed by filtration with heating. The obtained solids were washed with purified hexane until no free titanium was detected during the washing and dried to obtain a titanium-containing solid catalyst component having an average particle diameter of 115 μm and containing 1.6% by weight of titanium.

<2> Preliminary Polymerization of Titanium-containing Solid Catalyst Component (α)

After substituting the inside air with nitrogen gas, in a stainless steel reactor having an inner volume of 3 L provided with a tilted stirring blade, 1.7 L of saturated hydrocarbon solvent having a kinematic viscosity of 7.3 centistoke at 40° C. (CRYSTOL-52, manufactured by ESSO Petroleum Co., Ltd.), 105 mmol of triethylaluminum, 16 mmol of diisopropyldimethoxysilane, and 140 g of the titanium-containing solid catalyst component prepared as described above were added at room temperature, and the mixture was heated at 40° C. to react at a propylene partial pressure of 0.15 MPa for 7 hours to perform preliminary polymerization. As a result of analysis, it was found that 3.0 g of polypropylene per g of the titanium-containing solid catalyst component was produced.

<3> Production of Propylene Resin Composition

In a continuous horizontal type gas phase polymerization apparatus (I) of an inner volume of 100 L (length/diameter=6), its inside air was substituted by a nitrogen, equipped with a stirrer, 25 kg of polypropylene powder was added, and 0.5 g/h of the titanium-containing solid catalyst component subjected to the preliminary polymerization as described above as a titanium-containing solid catalyst, and triethylaluminum (organoaluminum (β)) and diisopropyldimethoxysilane (organosilicon compound (γ)) were continuously supplied at rates such that respective molar ratios being 90 and 30 relative to the titanium atom in the titanium-containing solid catalyst component.

Then, gas phase polymerization of propylene, a first polymerization step, was performed at a polymerization temperature of 70° C., with continuously supplying propylene so that the pressure in the polymerization apparatus was retained at 2.5 MPa and further adjusting the molar ratio of hydrogen to propylene in order to adjust the limiting viscosity of polypropylene. A portion of the obtained polymer was extracted and analyzed. The polypropylene (propylene homopolymer) in the first polymerization step had an limiting viscosity $[\eta]$ of 2.0 dl/g.

The polymer obtained in the first polymerization step was continuously supplied to a polymerization apparatus (II) (a continuous horizontal type gas phase polymerization apparatus of an inner volume of 100 L equipped with a stirrer, length/diameter=6) to perform random copolymerization of ethylene and propylene in a second polymerization step. By adjusting the polymerization conditions such that the pressure in the polymerization apparatus was 2.1 Mpa and adjusting the molar ratio of hydrogen to propylene, the limiting viscosity $[\eta]$ of the ethylene-propylene random copolymer and ethylene polymerization is unit content were adjusted. Furthermore, carbon monoxide was added in order to adjust the proportion of the ethylene-propylene random copolymer in the block copolymer.

During the polymerization period, the powder was extracted from the polymerization apparatus at a rate of 10.2 kg/h in order to maintain the level of powder retained in the polymerization apparatus to 50% by volume.

The extracted powder was treated by contacting nitrogen gas containing 5% by volume of water vapor at 100° C. for 30 minutes to obtain a polymer having a limiting viscosity $[\eta]$ of 2.0 dl/g and an ethylene polymerization unit content of 10.0% by weight.

The obtained polymer was a block copolymer having a polypropylene content of 70% by weight, an ethylene-propylene random copolymer content of 30% by weight and a limiting viscosity $[\eta]$ of 2.0 dl/g and the ethylene polymerization unit content of the ethylene-propylene random copolymer was 10% by weight.

The ethylene polymerization unit content of the ethylene-propylene random copolymer obtained in the second polymerization step was determined based on a calibration curve of infrared absorption spectrum made using as standard samples copolymers prepared in advance at various reaction ratios of ethylene-propylene. Further, the proportion of the ethylene-propylene random copolymer in the block copolymer was calculated from the ethylene polymerization unit content of the block copolymer. PP-2, PP-4 to PP-7 were produced in the same manner as PP-3 described above. Hereafter, the propylene homopolymer and polypropylene resin compositions used in Examples and Comparative Examples are indicated using abbreviations PP-1 to PP-8.

[PP-1]

A propylene homopolymer, wherein a MFR (230° C., 21.18N) is 3.0 g/10 min and an isotactic pentad fraction (P) is 0.96.

[PP-2]

A polypropylene resin composition containing a polypropylene homopolymer component and a copolymer component comprising ethylene and propylene, wherein a Q value is 4.5, a MFR (230° C., 21.18N) of the homopolymer component is 3.0 g/10 min and an isotactic pentad fraction (P) is 0.96, the content of the copolymer component comprising ethylene and propylene ($W_{RC}$) is 5.0% by weight, an ethylene content of the copolymer component is 30% by weight, a xylene-soluble component content is 95% by weight, and an limiting viscosity $[\eta]_{RC}$ is 2.0 dl/g and the ratio of the limiting viscosity of copolymer component to the limiting viscosity of homopolymer component ($[\eta]_{RC}/[\eta]_{PP}$) is 1.0.

[PP-3]

A polypropylene resin composition containing a polypropylene homopolymer component and a copolymer component comprising ethylene and propylene, wherein a Q value is 4.5, a MFR (230° C., 21.18N) of the homopolymer component is 3.0 g/10 min and an isotactic pentad fraction (P) is 0.96, the content of the copolymer component comprising ethylene and propylene ($W_{RC}$) is 10.0% by weight, an ethylene content of the copolymer component is 30% by weight, a xylene-soluble component content is 90% by weight, and a limiting viscosity $[\theta]_{RC}$ is 2.0 dl/g, and the ratio of the limiting viscosity of copolymer component to the limiting viscosity of homopolymer component ($[\eta]_{RC}/[\eta]_{PP}$) is 1.0.

[PP-4]

A polypropylene resin composition containing a polypropylene homopolymer component and a copolymer component comprising ethylene and propylene, wherein a Q value is 4.5, a MFR (230° C., 21.18N) of the homopolymer component is 3.0 g/10 min and an isotactic pentad fraction (P) is 0.96, the content of the copolymer component comprising ethylene and propylene ($W_{RC}$) is 25.0% by weight, an ethylene content of the copolymer component is 30% by weight, a xylene-soluble component content is 90% by weight, a limiting viscosity $[\eta]_{RC}$ is 2.0 dl/g and the ratio of the limiting viscosity of copolymer component to the limiting viscosity of homopolymer component ($[\eta]_{RC}/[\eta]_{PP}$) is 1.0.

[PP-5]

A polypropylene resin composition containing a polypropylene homopolymer component and a copolymer component comprising ethylene and propylene, wherein a Q value is 4.5, a MFR (230° C., 21.18N) of the homopolymer component is 0.5 g/10 min and an isotactic pentad fraction (P) is 0.96, the content of the copolymer component comprising ethylene and propylene ($W_{RC}$) is 25.0% by weight, an ethylene content of the copolymer component is 30% by weight, a xylene-soluble component content is 90% by weight, and a limiting viscosity $[\eta]_{RC}$ of 3.0 dl/g and the ratio of the limiting viscosity of copolymer component to the limiting viscosity of homopolymer component ($[\eta]_{RC}/[\eta]_{PP}$) is 0.5.

[PP-6]

A polypropylene resin composition containing a polypropylene homopolymer component and a copolymer component comprising ethylene and propylene, wherein a Q value is 4.5, a MFR (230° C., 21.18N) of the homopolymer component is 3.0 g/10 min and an isotactic pentad fraction (P) is 0.96, the content of the copolymer component comprising ethylene and propylene is 50.0% by weight ($W_{RC}$), an ethylene content of the copolymer component is 30% by weight, a xylene-soluble component content is 85% by weight, and a limiting viscosity $[\eta]_{RC}$ is 2.0 dl/g and the ratio of the limiting viscosity of copolymer component to the limiting viscosity of homopolymer component ($[\eta]_{RC}/[\eta]_{PP}$) is 1.0.

[PP-7]

A polypropylene resin composition containing a polypropylene homopolymer component and a copolymer component comprising ethylene and propylene, wherein a Q value is 4.5, a MFR (230° C., 21.18N) of the homopolymer component is 3.0 g/10 min and an isotactic pentad fraction (P) is 0.96, the content of the copolymer component comprising ethylene and propylene ($W_{RC}$) is 85.0% by weight, an ethylene content of the copolymer component is 30% by weight, a xylene-soluble component content is 85.0% by weight, a limiting viscosity $[\eta]_{RC}$ is 2.0 dl/g and the ratio of the limiting viscosity of copolymer component to the limiting viscosity of homopolymer component ($[\eta]_{RC}/[\eta]_{PP}$) is 1.0.

[PP-8]

A random copolymer comprising ethylene and propylene, wherein a Q value is 4.5, a MFR (230° C., 21.18N) is 5.0 g/10 min and an isotactic pentad fraction (P) is 0.88, and the ethylene component is 5.0% by weight.

EXAMPLES 1 to 6 and

Comparative Examples 1 to 5

A blend of 100 kg of propylene homopolymer or polypropylene resin composition selected from PP-1 to PP-8, 0.50 parts by weight of tetrakis[methylene-3-(3',5'-di-t-butyl-4'-hydroxyphenyl) propionate]methane as an antioxidant and 0.10 parts by weight of synthetic silica (average particle diameter: 2 $\mu$m) as a blocking inhibitor, per 100 parts by weight of the homopolymer or composition, were mixed uniformly using a Henschel mixer (trade name) and the obtained mixture was put into an extruder and melt-kneaded and then molded into pellet-form composition.

Then, the pellets were supplied to an extruder having an inlet diameter of 65 mm and fused at 240° C., followed by extrusion from a T-die and cooled by means of a cooling roll at 40° C. to obtain a sheet.

Then, the sheet was sequentially drawn using a pantagraph type biaxial stretching tester at a drawing ratio of 4.5 times longitudinally and 8.0 times transversely at a drawing rate of 10 m/min after preheating at 158° C. for 120 seconds in the case of the sheets obtained from the compositions PP-1 to PP-7, or after preheating at 145° C. for 120 seconds in the case of the sheet obtained from the composition PP-8 to obtain respective biaxially drawn films as shown in Table 1. Each of the films was used to prepare predetermined test samples and transparency, rigidity, permeability of gases were measured according to the predetermined test methods. The results obtained are shown in Table 1. As shown in Table 1, PP-3 to PP-6 correspond to Examples 1 to 4, respectively, and PP-1 and PP-2 correspond to Comparative Examples 1 and 2, respectively. PP-7 and PP-8 correspond to Comparative Examples 3 and 4, respectively. In Examples 5 and 6, the composition [PP-4] used in Example 2 was used.

TABLE 1

|  | Ex. 1 | Ex. 2 | Ex. 3 | Ex. 4 | Ex. 5 | Ex. 6 | Comp 1 | Comp 2 | Comp 3 | Comp 4 | Unit |
|---|---|---|---|---|---|---|---|---|---|---|---|
| composition | PP-3 | PP-4 | PP-5 | PP-6 | PP-4 | PP-4 | PP-1 | PP-2 | PP-7 | PP-8 | — |
| thickness | 25 | 25 | 25 | 25 | 20 | 30 | 25 | 25 | 25 | 25 | $\mu$m |
| Haze value | 3.0 | 4.5 | 5.0 | 5.0 | 4.0 | 5.0 | 1.5 | 2.5 | 10.0 | 1.5 | % |
| Young's modulus MD | 1700 | 1500 | 1550 | 1400 | 1500 | 1500 | 2100 | 1900 | 1100 | 900 | MPa |
| Permeability of water vapor | 10.0 | 15.5 | 14.0 | 25.5 | 20.0 | 13.0 | 5.5 | 7.5 | 60.0 | 6.0 | g/$m^2 \cdot 24$ hrs |
| Permeability of oxygen | 1250 | 1650 | 1550 | 3900 | 2100 | 1400 | 600 | 930 | 6200 | 660 | nmol(STP)/$m^2 \cdot s \cdot 100$kPa |

TABLE 1-continued

|  | Ex. 1 | Ex. 2 | Ex. 3 | Ex. 4 | Ex. 5 | Ex. 6 | Comp 1 | Comp 2 | Comp 3 | Comp 4 | Unit |
|---|---|---|---|---|---|---|---|---|---|---|---|
| Permeability of ethylene gas | 820 | 2500 | 2300 | 7900 | 3400 | 2100 | 350 | 520 | more than) 9900 | 380 | nmol(STP)/ $m^2 \cdot s \cdot 100kPa$ |
| $W_{RC}/D$ | 0.4 | 1.0 | 1.0 | 2.0 | 1.25 | 0.83 | — | 0.2 | 3.4 | — | Weight %/$\mu M$ |

Further, Table 2 shows examples of 30×30 cm side fusing sealed bags from respective films in which spinach was wrapped and stored at a temperature of 10° C. and a humidity of 50%, Table 3 shows examples of 20×30 cm bags in which bean sprouts were wrapped and stored at a temperature of 10° C. and humidity of 50%, and Table 4 shows examples of 30×40 cm bags in which cut lettuce was wrapped and stored at a temperature of 10° C. and humidity of 50%. In addition, Tables 2, 3 and 4 also show Comparative example 5 in which the same film of Comparative Example 1 was used with perforation at a ratio of 5 holes/30×30 cm, wherein the diameter of the holes was 3 mm.

TABLE 2

Spinach

|  | Ex. 1 | Ex. 2 | Ex. 3 | Ex. 4 | Comp 1 | Comp 2 | Comp 3 | Comp 4 | Comp 5 | Evaluation Standard |
|---|---|---|---|---|---|---|---|---|---|---|
| composition | PP-3 | PP-4 | PP-5 | PP-6 | PP-1 | PP-2 | PP-7 | PP-8 | PP-1 | ○; good |
| Perforations | No | No | No | No | No | No | No | No | Yes | Δ: slightly degraded |
| Freshness |  |  |  |  |  |  |  |  |  | ●: slightly dry |
| The number of days in storage |  |  |  |  |  |  |  |  |  |  |
| 1 | ○ | ○ | ○ | ○ | ○ | ○ | ○ | ○ | ○ | ▲: dry and slightly degraded |
| 2 | ○ | ○ | ○ | ○ | ○ | ○ | ○ | ○ | ○ |  |
| 3 | ○ | ○ | ○ | ○ | x | Δ | ○ | Δ | ○ |  |
| 4 | ○ | ○ | ○ | ○ |  | Δ | ○ | x | ○ | x: degraded |
| 5 | ○ | ○ | ○ | ○ |  | x | ● |  | ● |  |
| 7 | Δ | ○ | ○ | ○ |  |  | ● |  | ● |  |
| 14 | x | x | x | Δ |  |  | ▲ |  | ▲ |  |

TABLE 3

Bean sprouts

|  | Ex. 1 | Ex. 2 | Ex. 3 | Ex. 4 | Comp 1 | Comp 2 | Comp 3 | Comp 4 | Comp 5 | Evaluation Standard |
|---|---|---|---|---|---|---|---|---|---|---|
| composition | PP-3 | PP-4 | PP-5 | PP-6 | PP-1 | PP-2 | PP-7 | PP-8 | PP-1 | ○; good |
| Perforations | No | No | No | No | No | No | No | No | Yes | Δ: slightly degraded |
| Freshness |  |  |  |  |  |  |  |  |  | ●: slightly dry |
| The number of days in storage |  |  |  |  |  |  |  |  |  |  |
| 1 | ○ | ○ | ○ | ○ | ○ | ○ | ○ | ○ | ○ | ▲: dry and slightly degraded |
| 2 | ○ | ○ | ○ | ○ | Δ | ○ | ○ | ○ | ○ |  |
| 3 | ○ | ○ | ○ | ○ | x | Δ | ○ | x | ○ |  |
| 4 | ○ | ○ | ○ | ○ |  | x | ○ |  | ○ | x: degraded |
| 5 | Δ | ○ | ○ | ○ |  |  | ● |  | ● |  |
| 7 | x | Δ | Δ | ○ |  |  | ● |  | ● |  |
| 14 |  | x | x | x |  |  | ▲ |  | ▲ |  |

TABLE 4

Lettuce

|  | Ex. 1 | Ex. 2 | Ex. 3 | Ex. 4 | Comp 1 | Comp 2 | Comp 3 | Comp 4 | Comp 5 | Evaluation Standard |
|---|---|---|---|---|---|---|---|---|---|---|
| composition | PP-3 | PP-4 | PP-5 | PP-6 | PP-1 | PP-2 | PP-7 | PP-8 | PP-1 | ○; good |
| Perforations | No | No | No | No | No | No | No | No | Yes | Δ: slightly degraded |
| Freshness The number of days in storage |  |  |  |  |  |  |  |  |  | ●: slightly dry |
| 1 | ○ | ○ | ○ | ○ | ○ | ○ | ○ | ○ | ○ | ▲: dry and slightly degraded |
| 2 | ○ | ○ | ○ | ○ | Δ | ○ | ○ | Δ | ○ |  |
| 3 | ○ | ○ | ○ | ○ | x | Δ | ○ | x | ○ |  |
| 4 | Δ | ○ | ○ | ○ |  | x | ● |  | ● | x: degraded |
| 5 | x | ○ | ○ | ○ |  |  | ● |  | ● |  |
| 6 |  | Δ | Δ | Δ |  |  | ▲ |  | ▲ |  |
| 7 |  | x | x | x |  |  | x |  | x |  |

In Tables 2 to 4, wrapping bags using the drawn polypropylene films (Examples 1 to 6) having good permeability of gases maintained the freshness of fresh produce better than the wrapping bags of Comparative Example 5 that were perforated. The wrapping bag of the present invention had a fresh retaining period by 3 days or more longer than that of the conventional polypropylene wrapping bag without perforations.

EXAMPLES 7 to 9

Using the pellet-form composition obtained in Example 2 and the pellet-form compositions obtained in Comparative Examples 1 and 4, multilayer (bilayer) biaxially drawn films (thickness: 25 μm) having the construction ratios shown in Table 5 were prepared and predetermined test samples were prepared from the respective films, which were measured for permeability of each gas according to the predetermined test method. In the case of multilayer films, the construction ratio of the compositions used indicates the ratio the thicknesses of the films made of the respective compositions. The tests results are also shown in Table 5.

All of the Examples showed good permeability.

TABLE 5

|  |  | Ex.7 | Ex.8 | Ex.9 | Unit |
|---|---|---|---|---|---|
| Component | PP-4 | 50 | 75 | 90 | — |
| ratio | PP-1 | 50 | 25 | — |  |
|  | PP-8 | — | — | 10 |  |
| thickness |  | 25 | 25 | 25 | μm |
| Permeability of water vapor |  | 10.5 | 13.0 | 14.5 | g / $m^2 \cdot 24$ hrs |
| Permeability of oxygen |  | 1150 | 1400 | 1550 | nmol (STP) / $m^2 \cdot s \cdot 100$ kPa |
| Permeability of ethylene gas |  | 1450 | 2000 | 2300 | nmol (STP) / $m^2 \cdot s \cdot 100$ kPa |
| $W_{RC}/D$ |  | 2.0 | 1.33 | 1.11 | Weight %/μM |

The drawn polypropylene film in the present invention can be controlled of its permeability of gases, transparency, and mechanical properties (rigidity, etc.) by adjusting mainly the % by weight of the copolymer component comprising ethylene and propylene in the polypropylene resin composition.

Furthermore, the drawn film is an drawn polypropylene film excellent in productivity and profitability in that the step of physical perforation in the wrapping process can be eliminated and is effective as a wrapping material for fresh produce.

Industrial Applicability

The gas permeable film of the present invention properly restrains exhalation of water vapor while sufficiently maintaining incorporation of oxygen gas and exhalation of ethylene gas, with the result that it has an effect of maintaining the freshness of fresh produce for long period of time. The film of the present invention has permeability of gases suitable for wrapping fresh produce and the amount of gases that pass the obtained drawn polypropylene film and mechanical properties (rigidity, transparency, etc.) of the film can be adjusted by controlling the % by weight of the copolymer component comprising ethylene and propylene in the polypropylene resin composition used.

Further, the drawn polypropylene film of the present invention can eliminate the conventional step of physical perforation during the wrapping process so that it can provide high productivity and profitability.

Therefore, the gas permeable film of the present invention can be widely applied to the wrapping of fresh produce and the like.

What is claimed is:

1. A monolayer or multilayer film having a thickness $D_1$ of 10 to 100 μm, wherein the film comprises at least one layer obtained by processing and drawing a propylene resin composition in at least monoaxial direction, and the propylene resin composition comprises 93 to 30% by weight of a propylene polymer component and 7 to 70% by weight of a copolymer component comprising ethylene and propylene, and the film has the following characteristics:

(1) $T_{H2O}$=9 to 50 g/$m^2 \cdot 24$ Hr, when measured in accordance with JIS Z-0208, wherein $T_{H2O}$ represents a permeability of water vapor, (2) $T_{O2}$=600 to 12,500 nmol (STP)/$m^2 \cdot S$ 100 kPa, when measured in accordance with JIS K-7126A, wherein $T_{O2}$ represents a permeability of oxygen gas, and (3) $T_{ethylene}$=600 to 22,500 nmol (STP) /$m^2 \cdot S$ 100 kPa, when measured in accordance with JIS K-7126A, wherein $T_{ethylene}$ represents a permeability of ethylene gas.

2. The film as claimed in claim 1, wherein the propylene polymer component consists essentially of a propylene polymerization unit, and the copolymer component comprising ethylene and propylene consists essentially of an ethylene polymerization unit and a propylene polymerization unit.

3. The film as claimed in claim 1, wherein a limiting viscosity of the copolymer component $[\eta]_{RC}$ is 1.5 to 3.0 dl/g and a ratio $\eta_{RC}/_{PP}$ of the limiting viscosity of the copolymer component $\eta_{RC}$ to the limiting viscosity of the propylene polymer component $\eta_{PP}$ is in the range of 0.5 to 1.2 in the propylene resin composition.

4. The film as claimed in claim 1, wherein the copolymer component contains 20 to 90% by weight of ethylene based on the weight of the copolymer component in the propylene resin composition.

5. The film as claimed in claim 1, wherein the copolymer component contains 80 to 99.6% by weight of a 20° C. xylene-soluble component based on the weight of the copolymer component in the propylene resin composition.

6. The film as claimed in claim 1, wherein an isotactic pentad fraction (P) of the propylene polymer component is 0.85 to 0.99 in the propylene resin composition.

7. The film as claimed in claim 1, wherein a Q value of the propylene resin composition is not more than 5.

8. The film as claimed in claim 1, wherein the drawn propylene film is a drawn film obtained by drawing in the range of 3 to 60 times.

9. The film as claimed in claim 1, wherein the film is a film for wrapping fresh produce.

10. A monolayer film for wrapping fresh produce, which comprises:
   a propylene resin composition comprising a propylene polymer component and a copolymer component containing ethylene and propylene, wherein
   a content of the propylene polymer component $W_{PP}$ is 93 to 30% by weight, a content of the copolymer component $W_{RC}$ is 7 to 70% by weight based on the weight of the composition, a limiting viscosity 72 $_{RC}$ of the copolymer component is 1.5 to 3.0 dl/g and a ratio ($\eta_{RC}/\eta_{PP}$) of the limiting viscosity of copolymer component $\eta_{RC}$ to the limiting viscosity of propylene polymer component $\eta_{PP}$ is in the range of 0.5 to 1.2, and the film is a monolayer film having a thickness $D_1$ of 10 to 100 μm and is obtained by processing and drawing the propylene resin composition in the range from 3 to 60 times, and $D_1$ and $W_{RC}$ have a relationship of $0.1 \leq W_{RC}/D_1 \leq 7.0$, wherein the film has the following characteristics (1) to (3):
   (1) $T_{H2O}$=9 to 50 g/m²·24 Hr, when measured in accordance with JIS Z-0208,
   (2) $T_{O2}$=600 to 12,500 nmol(STP)/m²·S·100 kPa, when measured in accordance with JIS K-7126A, and
   (3) $T_{ethylene}$=600 to 22,500 nmol(STP)/m²·S·100 kPa, when measured in accordance with JIS K-7126A.

11. A multilayer film for wrapping fresh produce, comprising;
   a film (I) which comprises a propylene resin composition comprising a propylene polymer component and a copolymer component containing ethylene and propylene, wherein a content of the propylene polymer component $W_{PP}$ is 93 to 30% by weight, a content of the copolymer component $W_{RC}$ is 7 to 70% by weight based on the weight of the composition, a limiting viscosity of the copolymer component $\eta_{RC}$ is 1.5 to 3.0 dl/g and a ratio($\eta_{RC}/\eta_{PP}$) of the limiting viscosity of copolymer component $\eta_{RC}$ to the limiting viscosity of propylene polymer component $\eta_{PP}$ is in the range of 0.5 to 1.2, and the film (I) is obtained by processing and drawing the propylene resin composition in the range from 3 to 60 times, and
   a film (II) is obtained by processing at least one polymer selected from (a) to (d) listed below:
   (a) a propylene homopolymer having a density of 0.89 to 0.91 g/cm³ and a crystal melting point of 165 to 160° C.;
   (b) a copolymer comprising propylene and ethylene, which has a density of 0.89 to 0.91 g/cm³ and a crystal melting point of 159 to 110° C.;
   (c) a copolymer comprising propylene and an β-olefin having 4 or more carbon atoms, which has a density of 0.89 to 0.91 g/cm³ and a crystal melting point of 159 to 110° C.; and
   (d) a copolymer comprising ethylene, propylene and butene-1, which has a density of 0.89 to 0.91 g/cm³ and a crystal melting point of 159 to 110° C.;
   wherein the multilayer film has a thickness $D_1$ of 10 to 100 μm with the film (I) having 50% or more based on the thickness of the multilayer film, and the multilayer film has the following characteristics (1) to (3):
   (1) $T_{H2O}$=9 to 50 g/m²·24 Hr. when measured in accordance with JIS Z-0208,
   (2) $T_{O2}$=600 to 12,500 nmol(STP) /m²·S·100 kPa, when measured in accordance with JIS K-7126A.
   (3) $T_{ethylene}$ 600 to 22,500 nmol(STP) /m²·S·100 kPa, when measured in accordance with JIS K-7126A.

12. A method of controlling gas permeability of a propylene film comprises the steps of:
   processing and drawing a propylene resin composition, in the range from 3 to 60 times, comprising a propylene polymer component and a copolymer component containing ethylene and propylene, wherein a content of the propropylene polymer component $W_{pp}$, is 93 to 30% by weight, a content of the copolymer component $W_{RC}$ is 7 to 70% by weight based on the weight of the composition, a limiting viscosity of the copolymer component $\eta_{RC}$ is 1.5 to 3.0 dl/g and a ratio ($\eta_{RC}/\eta_{PP}$) of the limiting viscosity of copolymer component $\eta_{RC}$ to the limiting viscosity of propylene polymer component $\eta_{PP}$ is in the range of 0.5 to 1.2, to obtain a propylene film, and controlling in a range where the film has a thickness $D_1$ of 10 to 100 μm and a content of the copolymer $W_{RC}$ relative to the thickness $D_1$ such that a relationship of $0.1 < W_{RC}/D_1 < 7.0$ is satisfied.

13. A monolayer or multilayer film having a thickness $D_1$ of 10 to 100 μm, wherein the film is obtained by using a propylene polymer component consisting essentially of propylene polymerization units and a copolymer component comprising ethylene and propylene that consists essentially of propylene polymerization units and ethylene polymerization units, and has the following characteristics (1) to (3):
   (1) $T_{H2O}$=9 to 50 g/m²·24 Hr, when measured in accordance with JIS Z-0208,
   (2) $T_{O2}$=600 to 12,500 nmol(STP)/m²·S·100 kPa, when measured in accordance with JIS K-7126A, and
   (3) $T_{ethylene}$=600 to 22,500 nmol(STP)/m²·S·100 kPa, when measured in accordance with JIS K-7126A.

14. A monolayer or multilayer film having a thickness $D_1$ of 10 to 100 μm, wherein the film is obtained by using a propylene resin composition comprises a propylene polymer component and a copolymer component comprising ethylene and propylene, wherein a content of the propylene polymer component $W_{PP}$ is 93 to 30% by weight and a content of the copolymer component $W_{RC}$ is 7 to 70% by weight in the composition, and has the following characteristics:
   (1) $T_{H2O}$=9 to 50 g/m²-24 Hr, when measured in accordance with JIS Z-0208,
   (2) $T_{O2}$=600 to 12,500 nmol(STP)/m²·S·100 kPa, when measured in accordance with JIS K-7126A, and
   (3) $T_{ethylene}$=600 to 22,500 nmol(STP)/m²·S·100 kPa, when measured in accordance with JIS K-7126A.

15. The film as claimed in claim 13 or 14, wherein the film is a film for wrapping fresh produce.

* * * * *

UNITED STATES PATENT AND TRADEMARK OFFICE
CERTIFICATE OF CORRECTION

PATENT NO.    : 6,348,271 B1
DATED         : February 19, 2002
INVENTOR(S)   : Shinji Nakata et al.

It is certified that error appears in the above-identified patent and that said Letters Patent is hereby corrected as shown below:

Column 20,
Line 67, "$\eta_{RC/PP}$" to -- $(\eta_{RC}/\eta_{PP})$ --.

Column 21,
Line 28, change "$72_{RC}$" to -- $\eta_{RC}$ --.

Column 22,
Line 1, change "ß – olefin" to -- α – olefin --.

Signed and Sealed this

Fourteenth Day of January, 2003

JAMES E. ROGAN
*Director of the United States Patent and Trademark Office*